United States Patent
Strasser

[11] Patent Number: 6,153,291
[45] Date of Patent: Nov. 28, 2000

[54] CERAMIC-MATRIX COMPOSITE COMPONENT FABRICATION

[75] Inventor: Thomas Edward Strasser, Corona, Calif.

[73] Assignee: Northrop Grumman Corporation, Los Angeles, Calif.

[21] Appl. No.: 09/170,024

[22] Filed: Oct. 13, 1998

[51] Int. Cl.[7] .............................. C03C 14/00; B32B 17/12
[52] U.S. Cl. ..................................... 428/293.4; 428/294.1; 428/296.1; 428/298.7; 428/299.1; 428/299.4; 428/300.1; 264/257; 264/640; 159/88
[58] Field of Search ..................................... 264/257, 640; 428/293.4, 294.1, 296.1, 298.7, 299.1, 299.4, 300.1; 156/88

[56] References Cited

U.S. PATENT DOCUMENTS

| | | | |
|---|---|---|---|
| 4,828,774 | 5/1989 | Andersson et al. | 264/60 |
| 5,094,883 | 3/1992 | Muzzy et al. | 427/185 |
| 5,169,571 | 12/1992 | Buckley | 264/22 |
| 5,171,630 | 12/1992 | Muzzy et al. | 428/294 |
| 5,176,775 | 1/1993 | Montsinger | 156/181 |
| 5,192,387 | 3/1993 | Buckley | 156/275.5 |
| 5,192,475 | 3/1993 | Tredway | 264/115 |
| 5,229,052 | 7/1993 | Billiu | 264/115 |
| 5,232,638 | 8/1993 | Thiessen et al. | 264/6 |
| 5,261,980 | 11/1993 | Pearce | 156/173 |
| 5,296,064 | 3/1994 | Muzzy et al. | 156/180 |
| 5,302,332 | 4/1994 | Simola et al. | 264/119 |
| 5,413,750 | 5/1995 | Kelman et al. | 264/517 |
| 5,433,906 | 7/1995 | Dasch et al. | 264/117 |
| 5,460,854 | 10/1995 | Krug | 427/393.6 |
| 5,523,031 | 6/1996 | Ault et al. | 264/6 |
| 5,569,424 | 10/1996 | Amour | 264/115 |
| 5,672,389 | 9/1997 | Tran et al. | 427/294 |

*Primary Examiner*—Richard Weisberger
*Attorney, Agent, or Firm*—Terry J. Anderson; Karl J. Hoch, Jr.

[57] ABSTRACT

A method of fiber preparation for discontinuous fiber-reinforced ceramic matrix composite and a coated discontinuous fiber prepared by this method. The method includes immersing a fiber spool in a resin and drip drying the fiber spool until any excess resin is removed. Next, the damp fiber is cut or chopped and heated to the green-state cure temperature of the resin. After the resin has cured, the product is a coated discontinuous fiber whereby the inner fiber filament bundle is held together by a cured resin shell and the individual filaments are held together by the resin.

26 Claims, 1 Drawing Sheet

CERAMIC-MATRIX COMPOSITE COMPONENT FABRICATION

FIELD OF THE INVENTION

The present invention relates in general to ceramic matrix composite and more particularly to an improved method of fiber preparation for discontinuous fiber-reinforced ceramic matrix composite and a coated discontinuous fiber prepared by this method.

BACKGROUND OF THE INVENTION

Discontinuous fiber-reinforced ceramic matrix composite (CMC) is a useful material for many applications such as automobile engines and exhaust systems. For example, discontinuous fiber-reinforced CMC is used in components such as pistons for automobile engines as well as catalytic converters, exhaust manifolds, brake rotors and brake pads. These fiber-reinforced CMC components are resistant to extremely high temperatures and exhibit surprising strength and durability.

Discontinuous fiber-reinforced CMC is typically prepared by cutting or chopping the fiber into a predetermined length while the fiber is dry. The dry, discontinuous fiber is then mixed with a high-viscosity resin or resin and fillers to form a mixture. This mixture is then used to fabricate a discontinuous fiber-reinforced CMC component.

One problem associated with this fabrication method is that when the dry fiber is cut or chopped it tends to break up the tow or yarn into smaller diameter filament bundles than the original continuous fiber material. Moreover, when the fiber is chopped into less than approximately one-inch lengths, the fibers tend to become unraveled and frayed. In fact, these chopped fibers have "fluffy" consistency and resemble cotton. This unraveling and fraying of the fibers adversely affects the strength and durability of the final CMC component.

Another problem with this fabrication method is that the unraveled and frayed discontinuous fiber is extremely difficult to mix with high-viscosity resins and resins/fillers. Specifically, the fluffy consistency of the chopped fibers causes them to coagulate when mixed with the resin. Consequently, the mixture is not a homogeneous mixture but has fibers and possibly fillers distributed unevenly throughout the mixture. In addition, the mixture typically contains unwanted areas of unmixed dry fibers. Once again, this problem adversely affects the strength and durability of the final CMC component. Moreover, ease of manufacturing is negatively impacted because the mixture cannot easily be poured or injected due to its nonuniformity.

A further problem with the fabrication method relates to dust generation. In particular, the unraveling and fraying of the chopped fibers creates a great deal of dust. This dust generation makes the discontinuous fibers difficult to handle and can also clog machinery and other devices. In addition, excessive dust generation creates health hazards for humans and increases manufacturing costs because of the need to install safety equipment.

Therefore, what is needed is a fiber that will not unravel or fray when cut or chopped. This would thereby improve the strength and durability of CMC components. What is also needed is a fiber that mixes well with high-viscosity resins and resins/fillers. Specifically, the fiber would not coagulate when mixed with the resin and would create a more homogeneous mixture. This would simplify manufacturing by allowing preparation of a uniform mixture that could easily be poured, injected and compression molded.

What is further needed is a discontinuous fiber that avoids dust generation. This would permit easier handling of the discontinuous fibers. Moreover, this would decrease the hazards to both machinery and human health.

Whatever the merits of the above-mentioned methods of fiber preparation for discontinuous fiber-reinforced CMC, they do not achieve the benefits of the present invention.

SUMMARY OF THE INVENTION

To overcome the limitations in the prior art as described above and other limitations that will become apparent upon reading and understanding the present specification, the present invention includes a method of fiber preparation for discontinuous fiber-reinforced CMC as well as a resin-coated discontinuous fiber prepared by this method.

The method of the present invention permits a fiber to be prepared for discontinuous fiber-reinforced CMC such that the discontinuous fiber keeps its integrity by not unraveling or fraying. This new method yields discontinuous fiber with the advantages of being easier to handle, mixing well with resins and fillers and generating virtually no dust. All of these advantages contribute to the further advantages of a stronger, more durable final CMC component manufactured in a cleaner, safer manner. Moreover, the method of the present invention yields a resin-coated discontinuous fiber exhibiting all of the above-mentioned assets.

In a preferred embodiment, the present invention includes a method of fiber preparation for discontinuous fiber-reinforced CMC. Specifically, a fiber is first wet with a resin. Next, the fiber is drip dried to remove any excess resin. The damp fiber is then cut or chopped onto a screen material or the like. Finally, the damp discontinuous fiber is heated to the green-state cure temperature of the resin until the resin cures. This method yields a coated discontinuous fiber whereby a filament bundle is held together by the cured resin shell and individual filaments are bound by the resin.

In alternative embodiments, the step of drying the fiber to remove the excess resin can be excluded. Moreover, the step of placing the chopped fiber on the screen material can be omitted. Preferably, the resin is a polymer-derived ceramic precursor resin and the fiber is cut or chopped into lengths less than 2 inches.

The present invention also includes a new coated discontinuous fiber prepared by the above methods.

Other aspects and advantages of the present invention as well as a more complete understanding thereof will become apparent from the following detailed description, taken in conjunction with the accompanying drawings, illustrating by way of example the principles of the invention. Furthermore, it is intended that the scope of the invention be limited by the claims and not the preceding summary or the following detailed description.

BRIEF DESCRIPTION OF THE DRAWINGS

Referring now to the drawings in which like reference numbers represent corresponding parts throughout.

DETAILED DESCRIPTION OF THE PREFERRED EMBODIMENT

Figure 1:
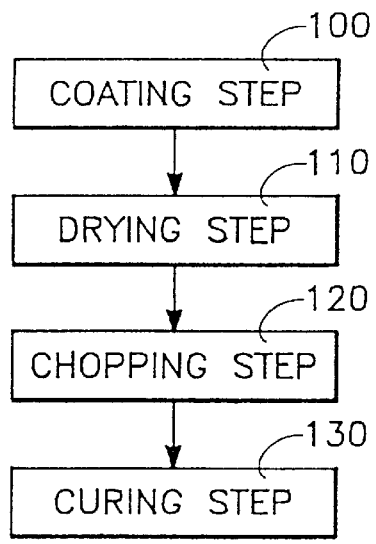
FIG. 1 is a flow process diagram illustrating a preferred embodiment of the method of the present invention.

In the following detailed description of the preferred embodiment, reference is made to the accompanying drawings in which is shown by way of illustration a specific embodiment whereby the invention may be practiced. It is to be understood that other embodiments may be utilized and structural changes may be made without departing from the scope of the present invention.

I. Introduction

As shown in the drawings for purposes of illustration, the present invention is embodied in a new method of preparing fiber for discontinuous fiber-reinforced CMC. Using the method of the present invention, a new coated discontinuous fiber is produced that does not unravel, fray or generate dust. Further, this coated discontinuous fiber mixes better with high-viscosity resins and fillers thereby creating a more homogeneous mixture that can be poured, injected and compression molded. Conversely, existing methods of preparing discontinuous fiber merely cut or chop the dry fiber. These methods produce an unraveled, frayed discontinuous fiber that coagulates when mixed with resin, generates a great deal of dust, and produces components that have reduced strength and durability.

In a preferred embodiment of the method of the present invention, a fiber is coated or wet with a resin. The fiber is then drip dried to remove any excess resin. Next, the damp fiber is cut or chopped onto a screen material or the like. The damp, discontinuous fiber is then heated to the green-state cure temperature of the resin until the resin has cured. Typically, the green-state cure temperature is specified by the resin manufacturer. For example, AlliedSignal specifies that the green-state cure temperature for their Blackglas™ resin is 280° F. After the resin has been cured, the result is the aforementioned coated discontinuous fiber.

II. Method of the Invention

FIG. 1 is a flow process diagram of the method of the present invention illustrating a preferred embodiment. Referring to FIG. 1, the coating step 100 includes the step of wetting or coating a fiber with a resin. Preferably, this is accomplished by immersing a spool of fiber in the resin until the fiber is thoroughly wet.

The resin is a polymer-derived ceramic precursor resin that is generally of a low-viscosity. Resins such as Allied-Signal's Blackglas™ 493A, Dupont-Lanxide's Ceraset™, Dow-Corning's Sylramic™ and the like are resins suitable for use with this method. Furthermore, the fiber may be chosen from materials including, for example, alumina, Nextel 312, Nextel 440, Nextel 510, Nextel 550, silicon nitride, silicon carbide, HPZ, graphite, carbon, and peat. Additionally, the fiber may be a combination of some or all of these materials. This list is not meant to be exhaustive, and those with ordinary skill in the art will recognize that the fiber may be made from other similar materials.

Next, during the drying step 110 the fiber coated with the resin is dried to remove any excess resin. Preferably, this drying occurs by drip drying the wet fiber until the excess resin is removed. In this damp state, the filament bundles within the tow or yarn stay together. In other words, the integrity of the fiber is preserved because the fiber does not unravel or fray.

During the chopping step 120 the damp fiber is cut or chopped into a discontinuous fiber. Preferably, the fiber is deposited onto a screen material that allows any remaining excess resin to run off and be recycled. In alternate embodiments the chopping step 120 does not include depositing the fiber onto the screen material. Furthermore, in yet another embodiment, the chopping step 120 is the final step of the method and the damp fiber is deposited directly into the high-viscosity resin and filler mixture for fabrication into a discontinuous fiber-reinforced CMC component. In either embodiment the mixture may constitute only the resin or may be a combination of resins and fillers. Typically, the fillers are a ceramic powder with particles of less than 60 microns in size.

The damp fiber may be cut or chopped into any length desired. However, for use in a discontinuous fiber-reinforced CMC component the fiber is usually less than two inches in length. Consequently, during the chopping step 120 the fiber is preferably cut or chopped into lengths less than two inches. The fiber length may be longer; however, the problem of the fiber unraveling and fraying usually is not as severe at lengths greater than two inches.

During the curing step 130, the resin on the fiber is cured. This is achieved by placing the screen material containing the damp discontinuous fiber into an oven (batch or continuous) and heating the resin to its green-state cure temperature. In addition, there are several other methods which may be used to cure the resin. After curing, the process yields a new coated discontinuous fiber that is described in detail below.

III. Product of the Invention

Figure 2:
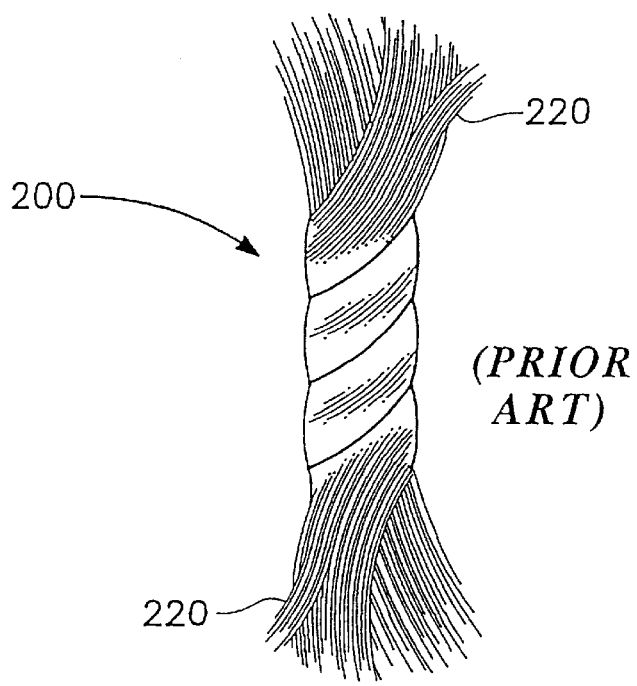
FIG. 2 is an illustration of a fiber that has been dry cut or chopped and has unraveled, frayed and separated into tiny filaments.

In FIG. 2 is illustrated a fiber 200 that has been cut or chopped while dry as taught in the prior art. The fiber 200 has unraveled, frayed and separated into individual filaments 220 along a substantial percentage of its length. This results in a dry discontinuous fiber 200 which exhibits a "fluffy" texture resembling the consistency of cotton. In this state, the dry discontinuous fiber 200 is difficult to mix with the high-viscosity resins and fillers to create a homogeneous mixture. Moreover, because the dry discontinuous fiber 200 is composed of individual filaments 220 that easily break off, there is a great deal of fiber dust generated.

Figure 3:
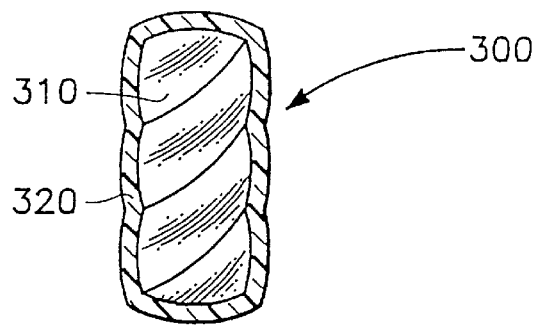
FIG. 3 is an illustration of a coated discontinuous fiber prepared by the method of the present invention shown in FIG. 1.

FIG. 3 illustrates a new coated discontinuous fiber 300 prepared by the method of the present invention. The coated discontinuous fiber 300 includes an inner fiber filament bundle 310. Coating the inner fiber filament bundle 310 is a resin coating 320 that coats the inner fiber filament bundle 310 and preserves the integrity of the inner fiber filament bundle 310. In particular, the resin coating 320 prevents the inner fiber filament bundle 310 from unravelling, fraying or separating into individual filaments 220. This resin coating 320 may include the wet resin that merely coats the inner fiber filament bundle 310 or may include a cured resin "shell" whereby the inner fiber filament bundle 310 is sealed by the cured resin. Furthermore, in the cured state the individual filaments of the inner filament bundle 310 are also bound together by the resin.

The method and resulting coated discontinuous fiber of the present invention may be used in the fabrication of discontinuous fiber-reinforced CMC components. This results in components that have improved strength and durability because the reinforcing fiber retains its integrity. Furthermore, the strength and durability of the component is improved because the discontinuous fiber is evenly dispersed throughout the component.

Figure 4:
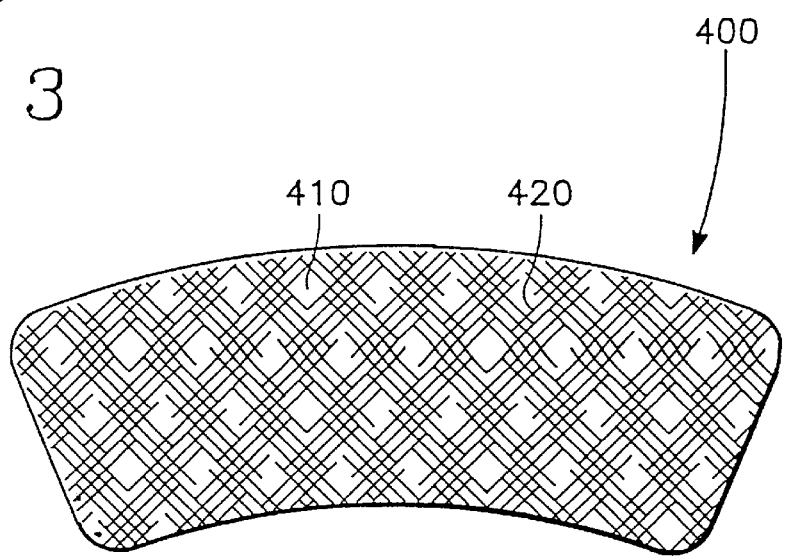
FIG. 4 is an illustration of a brake pad made of a ceramic matrix composite material and reinforced with the coated discontinuous fiber shown in FIG. 3.

In FIG. 4, a brake pad 400 is used as an example of a component made with a ceramic matrix composite material 410 and reinforced with the coated discontinuous fiber 420. Moreover, the coated discontinuous fiber was prepared by the method of the present invention as illustrated in FIG. 1 and described above.

The CMC brake pad 400 has the coated discontinuous fiber 420 dispersed evenly throughout the CMC material 410. This homogeneous dispersion is because the coated discontinuous fiber 420 mixed well with the precursor high-viscosity resin and created a more homogeneous mixture. Moreover, because of the improved homogeneity of the mixture, several methods could have been used to manufacture and form a CMC component including compression molding, injection molding, transfer molding and extrusion.

After molding and curing, the component has the fiber evenly distributed throughout and has greater strength and durability because the fiber has not unraveled or frayed. Moreover, there is virtually no dust generation because the integrity of the fiber is retained.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A coated discontinuous non-frayed fiber prepared by a method comprising the steps of:
   a) disposing a polymer-derived ceramic precursor resin on the fiber;
   b) chopping the fiber to form a discontinuous fiber; and
   c) heating the resin disposed on the discontinuous fiber to the green-state cure temperature of the resin.

2. The invention as set forth in claim 1, wherein the fiber comprises at least one of alumina, silicon nitride, silicon carbide, graphite, carbon and peat.

3. The invention as set forth in claim 1, further comprising, between step a) and step b), the step of:
   removing any excess resin from the fiber.

4. The invention as set forth in claim 3, wherein the step of removing the excess resin from the fiber further comprises drip drying the fiber.

5. The invention as set forth in claim 1, wherein step b) further comprises chopping the fiber into a length less than approximately 2 inches.

6. The invention as set forth in claim 1, further comprising, between step b) and step c), the step of:
   disposing the discontinuous fiber on a screen material.

7. A coated discontinuous non-frayed fiber for a discontinuous fiber-reinforced ceramic matrix composite, comprising:
   a) a polymer-derived ceramic precursor resin; and,
   b) a fiber prepared by disposing the resin on the fiber, chopping the fiber to form a discontinuous fiber and curing the resin disposed on the discontinuous fiber.

8. The invention as set forth in claim 7, wherein the fiber comprises at least one of alumina, silicon nitride, silicon carbide, graphite, carbon and peat.

9. The invention as set forth in claim 7, wherein the fiber is further prepared by, after disposing the resin on the fiber and before chopping the fiber:
   removing any excess resin from the fiber.

10. The invention as set forth in claim 9, wherein the fiber is further prepared by removing any excess resin from the fiber by drip drying the fiber.

11. The invention as set forth in claim 7, wherein the fiber is further prepared by chopping the fiber into a length less than approximately 2 inches.

12. The invention as set forth in claim 7, wherein the fiber is further prepared by, after chopping the fiber and before curing the resin:
   disposing the discontinuous fiber on a screen material.

13. The invention as set forth in claim 7, wherein the fiber is further prepared by curing the resin disposed on the discontinuous fiber by heating the resin to its green-state cure temperature.

14. A method of preparing a fiber for a discontinuous fiber-reinforced ceramic matrix composite, the method comprising the steps of:
   a) disposing a polymer-derived ceramic precursor resin on the fiber;
   b) chopping the fiber to form a discontinuous fiber; and
   c) curing the resin disposed on the discontinuous fiber.

15. The invention as set forth in claim 14, wherein the fiber comprises at least one of alumina, silicon nitride, silicon carbide, graphite, carbon and peat.

16. The invention as set forth in claim 14, further comprising, between step a) and step b), the step of:
   removing any excess resin from the fiber.

17. The invention as set forth in claim 16, wherein the step of removing the excess resin from the fiber further comprises drip drying the fiber.

18. The invention as set forth in claim 14, wherein step b) further comprises chopping the fiber into a length less than approximately 2 inches.

19. The invention as set forth in claim 14, further comprising, between step b) and step c), the step of:
   disposing the discontinuous fiber on a screen material.

20. The invention as set forth in claim 14, wherein step c) further comprises heating the resin disposed on the discontinuous fiber to the green-state cure temperature of the resin.

21. A method of preparing a fiber for a discontinuous fiber-reinforced ceramic matrix composite, the method comprising the steps of:
   a) disposing a polymer-derived ceramic precursor resin on the fiber;
   b) chopping the fiber to form a discontinuous fiber; and
   c) heating the resin disposed on the discontinuous fiber to the green-state cure temperature of the resin.

22. The invention as set forth in claim 21, wherein the fiber comprises of at least one of alumina, silicon nitride, silicon carbide, graphite, carbon and peat.

23. The invention as set forth in claim 21, further comprising, between step a) and step b), the step of:
   removing any excess resin from the fiber.

24. The invention as set forth in claim 23, wherein the step of removing the excess resin from the fiber further comprises drip drying the fiber.

25. The invention as set forth in claim 21, wherein step b) further comprises chopping the fiber into a length less than approximately 2 inches.

26. The invention as set forth in claim 21, further comprising, between step b) and step c), the step of:
   disposing the discontinuous fiber on a screen material.

* * * * *